INVENTOR.
FREDERICK BLANCKE SYLVANDER

ATTORNEY

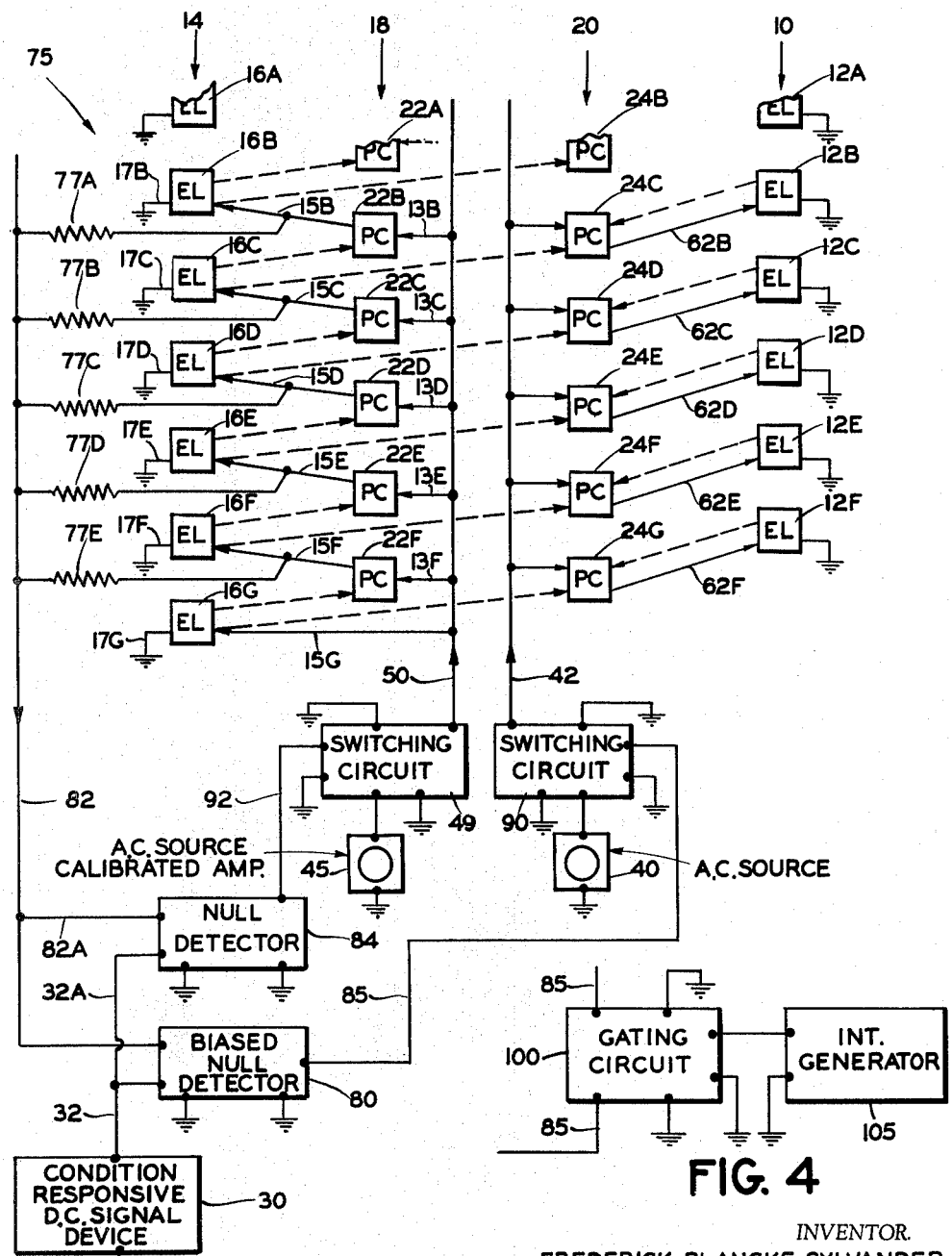

INVENTOR.
FREDERICK BLANCKE SYLVANDER
BY Herbert L. Davis
ATTORNEY

United States Patent Office 3,221,170
Patented Nov. 30, 1965

3,221,170
ELECTROLUMINESCENT-PHOTOCONDUCTOR
MEANS FOR LIGHTED COLUMN DISPLAY
Frederick Blancke Sylvander, Rutherford, N.J., assignor to The Bendix Corporation, Teterboro, N.J., a corporation of Delaware
Filed Jan. 28, 1963, Ser. No. 254,373
6 Claims. (Cl. 250—209)

The invention relates to improved electroluminescent-photoconductor means for lighted column display, and more particularly to an indicator display means in which a linear scale of variable height is provided to graphically represent the datum to be indicated, and an arrangement in which the display column is made up of a series of electroluminescent segments.

In the aforenoted arrangement, the electrical luminescent segments are of a conventional type having thin films of a phosphor material sandwiched or positioned immediately between two electrical conductive layers, one or both of which may be transparent. In such arrangement, application of a varying voltage to the outer conductor layers will, under proper conditions, cause the phosphor material to emit light, the complete explanation of this phenomena is probably not fully understood at this time.

An object of the invention is to utilize these electroluminescent film type elements together with similar film type elements having the properties of photoconductors in a novel indicator arrangement and in a field commonly understood as EL-PC circuitry (electroluminescent-photoconductor circuitry).

Another object of the invention is to provide a novel indicator device actuated by means of a complex network so arranged as to distribute an input signal so as to control the application of an A.C. voltage to appropriate electroluminescent segments through the operation of suitable photoconductor segments operatively connected so as to effect the indicator function through the electroluminescent segments.

Another object of the invention is to provide novel electroluminescent photoconductor means for effecting an optimum voltage supply to suitable electroluminescent indicator display means.

Another object of the invention is to provide a novel electroluminescent-photoconductor means for effecting an optimum voltage supply to suitable electroluminescent indicator display means.

Another object of the invention is to provide a novel electroluminescent-photoconductor means in a latching circuit to effect the desired indicator function.

In the aforenoted novel electroluminescent-photoconductor indicator means, the total time required for the shifting action to travel the entire length of the indicator column may be less than that time which would be noticed by the eye of the observer, i.e., about $1/_{15}$ of a second. However, in the case of certain types of common photoconductor materials, the time constant may be about five milliseconds per stage, and in the case of a column of, for example, two hundred electroluminescent segments, the total time to travel the entire length of such a column may be one second. Such an arrangement operating in conjunction with a one second de-latching period for the indicator column may result in an indicator column display which will show progressively less brightness on the higher electroluminescent segments and thereby present an indicator problem.

An object of the invention, therefore, is to provide novel means for effecting a solution of this problem of lighting the higher segments in providing a resistive summing network connected between a controlling null detector and the electroluminescent-photoconductor segments of the controlling column instead of connecting the resistive summing network between the controlling null detector and the electroluminescent-photoconductor segments of the indicator column.

Another object of the invention is to provide a biased null detector in the last-mentioned indicator column display device so arranged as to de-latch or open the energizing circuit to the electroluminescent-photoconductor segments of the indicator column at a time about one-fifteenth of a second before the electroluminescent-photoconduct or segments of the controlling column have reached the datum level and thereafter close the energizing circuit to such segments of the controlling column so that when the electroluminescent segments of the controlling column reach the datum level, the electroluminescent segments of the indicator column will latch onto the electroluminescent segments of the controlling column, and thereafter, a true null detector will cause a suitable switching means to delatch or open the energizing circuit of the electroluminescent segments of the controlling column.

The aforenoted modified form of the invention is designed to improve the performance of the original form of the electroluminescent-photoconductor means under a high valued datum input and an undesirably long photoconductor time constant. The modified form of the invention may have an inherent disadvantage in the case of a low valued datum input in as much as the latching and delatching action may be occurring at a high rate so as to make a part of the indicator column less bright than it would be for a high valued datum input.

Another object of the invention, therefore, is to provide novel means for overcoming the latter problem.

Another object of the invention is to provide novel means for overcoming the aforenoted problem by interposing a periodic gating circuit means between the biased null detector and the indicator column switching circuit so arranged as to permit the latching action to take place no more than once per second, for example, so that a latching action of the segmented indicator column may not take place every time the biased null detector commands, but rather is limited by the action of the periodic gating circuit.

These and other objects and features of the invention are pointed out in the following description in terms of the embodiments which are shown in the accompanying drawings. It is to be understood, however, that the drawings are for the purpose of illustration only and are not a definition of the limits of the invention, reference being had to the appended claims for this purpose.

In the drawings:

FIGURE 3 is a schematic circuit diagram of a modified form of an electroluminescent-photoconductor display means embodying the invention.

FIGURE 4 is a fragmentary view of a modified form of the invention of FIGURE 3.

Figure 1:
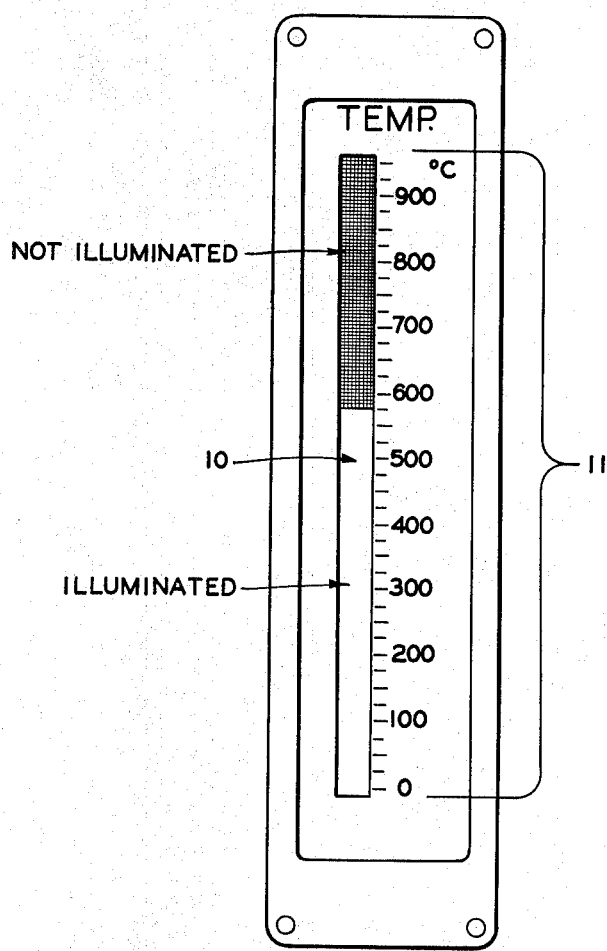
FIGURE 1 is a front plan view of an electroluminescent temperature indicator embodying the invention.
Figure 2:
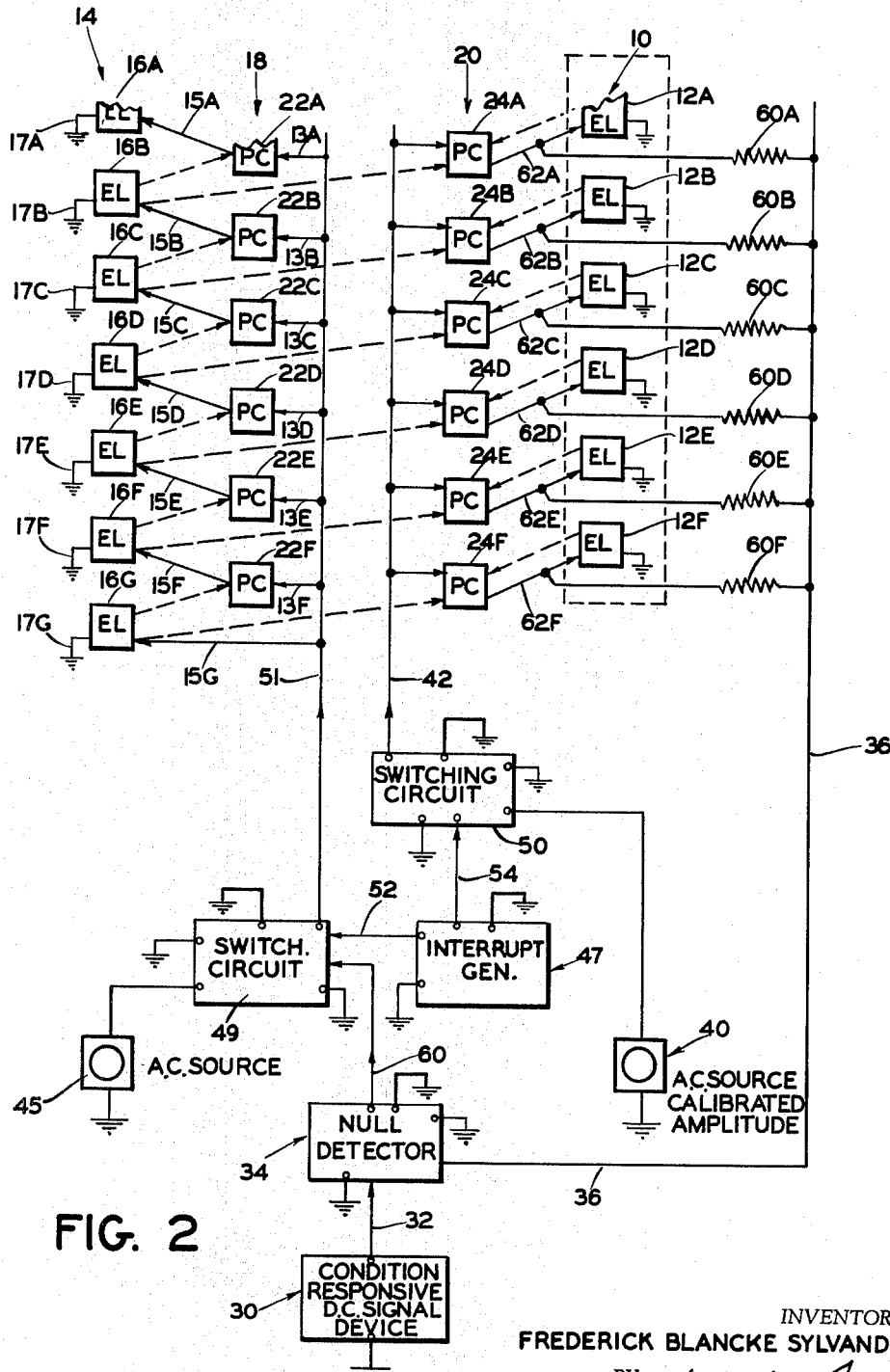
FIGURE 2 is a schematic circuit diagram of an elecing the invention.

Referring to the drawings of FIGURES 1 and 2, there is indicated by the numeral 10 a variably lighted indicator display column which may be viewed by the operator and so arranged in cooperative relation with suitable indicator numerals 11 so as to provide the desired indicator function.

The display column 10, as shown schematically in FIGURE 2, includes a series of electroluminescent segments 12 which may be sequentially arranged, for example, with thirty-two of the segments arranged to the inch, and said segments being positioned in cooperative relation with suitable indicator lines, markings or designations 11, as shown in FIGURE 1.

Thus the electroluminescent segments 12, as shown schematically in FIGURE 2, and indicated by way of example by the numerals 12A to 12F may be sequentially lighted so as to constitute suitable display means cooperating with the indicator numerals 11 of FIGURE 1 to indicate the sensed condition which, in the example given, may be temperature.

There is further indicated by the numeral 14 a second column of electroluminescent segments which may include a series of electroluminescent segments 16A to 16G which are so arranged as not to be visible on the face of the indicator, and as such do not provide an indicating function, but rather cooperate to control the operations of the electroluminescent segments 12A to 12F of the variable light indicator column 10.

The column 14 electroluminescent segments 16A to 16G may be physically split into two parts so that each electroluminescent segment in 14, when lighted, may shine light, indicated by dotted line arrows, upon a corresponding photoconductor segment 22 in column 18 and a photoconductor segment 24 in column 20 to render the same electrically conductive. Column 18 may include photoconductor segments 22A to 22F while column 20 may include photoconductor segments 24A to 24F.

The lower or initial electroluminescent segment 16G of the column 14 is electrically energized through a conductor 15G and ground 17G while the remaining electroluminescent segments of column 14 and the photoconductor segments 22 of column 18 are similarly electrically energized through conductors 13F–13A, 15F–15A and ground connection 17F–17A under control of the photoconductors 22F–22A. The respective photoconductor segments 22 are interconnected with the electroluminescent segments 16 so that the excitation of each electroluminescent segment in column 14 is controlled by the next lower photoconductor segment in column 18 which is rendered conductive by the direction of light rays thereon by a cooperating electroluminescent segment, as indicated by dotted arrows of FIGURE 2, upon the electrical energization in such electroluminescent segments.

The electroluminescent segments (the display column) of column 10 are similarly cooperatively connected and arranged in relation to the photoconductor segments in column 20 so that each of the electroluminescent segments of column 10 is controlled by each of the next lower photoconductor segments in column 20. Also, the column 10 electroluminescent segments shine light back onto their corresponding control photoconductor segments of column 20 so as to provide a holding circuit to maintain the photoconductor segments electrically conductive so long as the main energizing line 42 is not opened.

Further, as shown in FIGURE 2, a D.C. input signal varying in amplitude with a sensed datum or condition such as temperature, applied by a temperature sensing probe of conventional type indicated by the numeral 30, is applied through a control line 32 to a null detector 34 which may be of a conventional Schmitt trigger type arranged for detecting the difference between the input D.C. signal and the peak of the summed A.C. signal applied through a line 36, as explained hereinafter in greater detail.

There is further provided two sources of A.C. power, one indicated by the numeral 40 having an accurately calibrated peak amplitude and the other A.C. source indicated by the numeral 45. In addition, a suitable means indicated by the numeral 47 such as a blocking oscillator or interrupt generator is provided for generating a periodic "interrupt" signal. The switching circuits indicated by the numerals 49 and 50 are operated by the "interrupt" generator 47 through the control lines 52 and 54 and are capable of controlling the A.C. supplies 40 and 45 in response to appropriate control signals.

Thus the null detector 34 is arranged to apply a control signal through a line 60 to the switching circuit 49 causing the switching circuit 49 to disconnect the A.C. source 45 from the power line 51 upon the null detector 34 sensing an equality between the input D.C. signal applied through line 32 and the peak of summed or feedback A.C. signal applied through line 36, while the interrupt generator 47 periodically applies through the line 52 a pulse to the switching circuit 49 to close the switching circuit 49 connecting the A.C. source 45 once again to the power line 51 and simultaneously applies a signal through line 54 to the switching circuit 50 to cause circuit 50 to disconnect the source 40 from the main energizing line 42 for less than a twentieth of a second.

In the aforenoted arrangement, the A.C. voltage is applied from the source 45 through the switching circuit 49 and power line 51 to the lowest electroluminescent segment 16G in column 14 through the conductors 15G–17G causing it to light and causing it in turn to shine upon the photoconductor segments 22F and 24F in columns 18 and 20, respectively, as indicated by dotted arrows, so as to selectively render the same conductive.

This in turn causes the next succeeding electroluminescent segment 16F in the column 14 to be energized through the photoconductor segment 22F and the lower electroluminescent segment 12F of the column 10 to be supplied with electrical energy through the photoconductor segment 24F and thus cause both electroluminescent segments 16G and 12F to light.

It will be noted that once any segment in column 10 lights, it remains lighted due to feedback of light from column 10 to the corresponding photoconductor segments of column 20 to maintain the same conductive.

Resistors 60A to 60F are connected to the excitation leads 62A to 62F, respectively, of each electroluminescent segment in column 10, and these resistors come to a common junction at the conductor 36 at which a summation voltage may be obtained which is a direct function (either linear or nonlinear) of the number of segments lighted in column 10.

The aforenoted summation voltage is then compared in the null detector 34 in peak value to the input D.C. signal applied through the line 32. At the instant that these two signals become equal, a signal is applied through the output line 60 to the switching circuit 49 controlling columns 14 and 18 and causing the switching circuit 49 to be open so as to stop the progress of the lighting of columns 14 and 10.

The lighting of the electroluminescent segments in the column 14 is then terminated, but the lighted electroluminescent segments in column 10 stay on due to the latching action of the feedback.

At regular intervals, such as once per second, the "interrupt" generator 47 produces a signal to the line 54 which causes the switching circuit 50 to momentarily open for less than a twentieth of a second so as to de-latch all the segmental lights in column 10 and thereafter cause the switching circuit 50 to close so as to turn on the excitation to columns 20 and 10 thus initiating the indicator cycle of operation. If the input datum or sensed condition has changed, the display to column 10 in following the illumination of the segments 16 of column 14 will next indicate the new value. The period of "interruption" is so short, it is not visible to the eye.

The aforenoted indicator system provides certain advantages in the provision of novel means of effecting the optimum voltage supply to the several electroluminescent segments, and in the provision of a simple compact, easily produced indicator arrangement.

Modified form of the invention

In the form of the invention illustrated in FIGURE 2, it is assumed that the total time required for the shifting action of the variable light column 10 of FIGURE 1 to travel the entire length of the series of electroluminescent segments 12F–12A would be less than that time which may be noticed by the eye of the observer, i.e., about one-fifteenth of a second. However, in the case of certain types of common photoconductor materials, the time constant might be about five milliseconds per stage, and in the case of, for example two hundred electroluminescent segments, the total time might be one second. This in conjunction with a one second delatching period for column 10 would result in a display by the column 10 which would show progressively less brightness in the segments at the upper end of the series of electroluminescent segments 12, due to the duty cycle of each segment.

In order to solve the aforenoted problem inherent in the arrangement of FIGURE 2, the modified form of the electroluminescent-photoconductor indicator, shown in FIGURE 3, has been provided in which a resistive summing network indicated by the numeral 75 and including resistor elements 77A to 77E are connected from conductors 15F–15B leading from the respective photoconductor segments 22F–22B of column 18 instead of from the photoconductor segments 24F–24A of column 20, as in the form of the invention of FIGURE 2. The A.C. source 45 in the form of the invention of FIGURE 3 may be of calibrated amplitude rather than the source 40 which is of calibrated amplitude in FIGURE 2.

Further, in the modified form of the invention shown in FIGURE 3, there is provided a biased null detector 80 which may be of a Schmitt trigger type operatively connected through an input connection 82 with the resistive summing network 75 and through conductor 32 with the variable D.C. output voltage applied by a condition sensitive device 30 such as for example a thermocouple.

The biased null detector 80 is arranged to sense the difference between the D.C. control voltage applied through conductor 32 and the peak of the A.C. summing voltage applied through conductor 82. The null detector 80 senses the difference and is so biased as to apply a signal through the line 85 to cause the switching circuit 90 to momentarily disconnect the power source 40 from the line 42 and thereby de-latch the column 10 of electroluminescent segments 12F–12A at a time about one fifteenth of a second or one segment 12 before the electroluminescent segments 16G–16A of the column 14 have reached the datum level.

When the photoconductor segments 22F–22A of the column 18 and corresponding electroluminescent segments 16G–16A have reached the required height or datum level, a true null detector 84 which may also be of a Schmitt trigger type is operative upon the D.C. output signal applied by the thermocouple 30 being equal to the peak of the A.C. summing voltage applied through the line 82A to cause the switching circuit 49 to disconnect the power source 45 from line 50 after the column 10 electroluminescent segments 12F to 12A have first latched onto the segments of column 14 with the detector 84 being so timed as to cause switching circuit 49 to open thereafter so as to deenergize the electroluminescent segments 16G–16A of column 14.

The null detector 84 has the D.C. input signal applied thereto through line 32A and a summing signal from the network 75 applied thereto through a conductor 82A. The null detector 84 then is effective to detect the difference between the input D.C. signal and the sum of the A.C. signal so that, when the two signals become equal, the null detector 84 applies a signal through the line 92 which causes a switching circuit 49 to momentarily open the circuit 50 so as to stop the progress of the lighting of the segments of columns 14 and 10 at the datum level.

Thus, it will be seen that, when the column 18 photoconductor segments reach the datum level, the biased null detector 80 will permit the column 10 electroluminescent segments or lights to first latch onto the column 14 electroluminescent segments at the height thereof while the null detector 84 will immediately thereafter cause the switching circuit 49 to open the line 50 to deenergize the column 14 electroluminescent lights at the datum level. The opening of circuit 50 will, of course, unbalance the null detector 84 to once again close switch 49 to cause a repetition of the controlling action.

It will be seen then that the modified form of the invention, shown in FIGURE 3, will provide an improved performance over that of the arrangement of FIGURE 2 in the case of high valued datum input and undesirably long photoconductor time constants while the arrangement of FIGURE 3 will have a disadvantage in the case of a low datum value input because the latching and delatching will be occurring at a high rate, thus making that part of the column 10 lights less bright than it would be for high datum value input.

This last problem may be overcome by interposing a periodic gating circuit, shown in FIGURE 4, and indicated by the numeral 100, between the biased null detector 80 and the switching circuit 90 for the photo-conductor column 20 and electroluminescent column 10. The gating circuit 100 may be operatively controlled by an interrupter generator 105 so arranged as to periodically cause the gating circuit 100 to open the control line 85 so as to allow the latching action under control of the biased null detector 80 to take place no more than once per second, for example. In other words, the latching action would not take place every time the biased null detector 80 commands, but rather such command action would be limited by the gating circuit 100.

Figure 5:
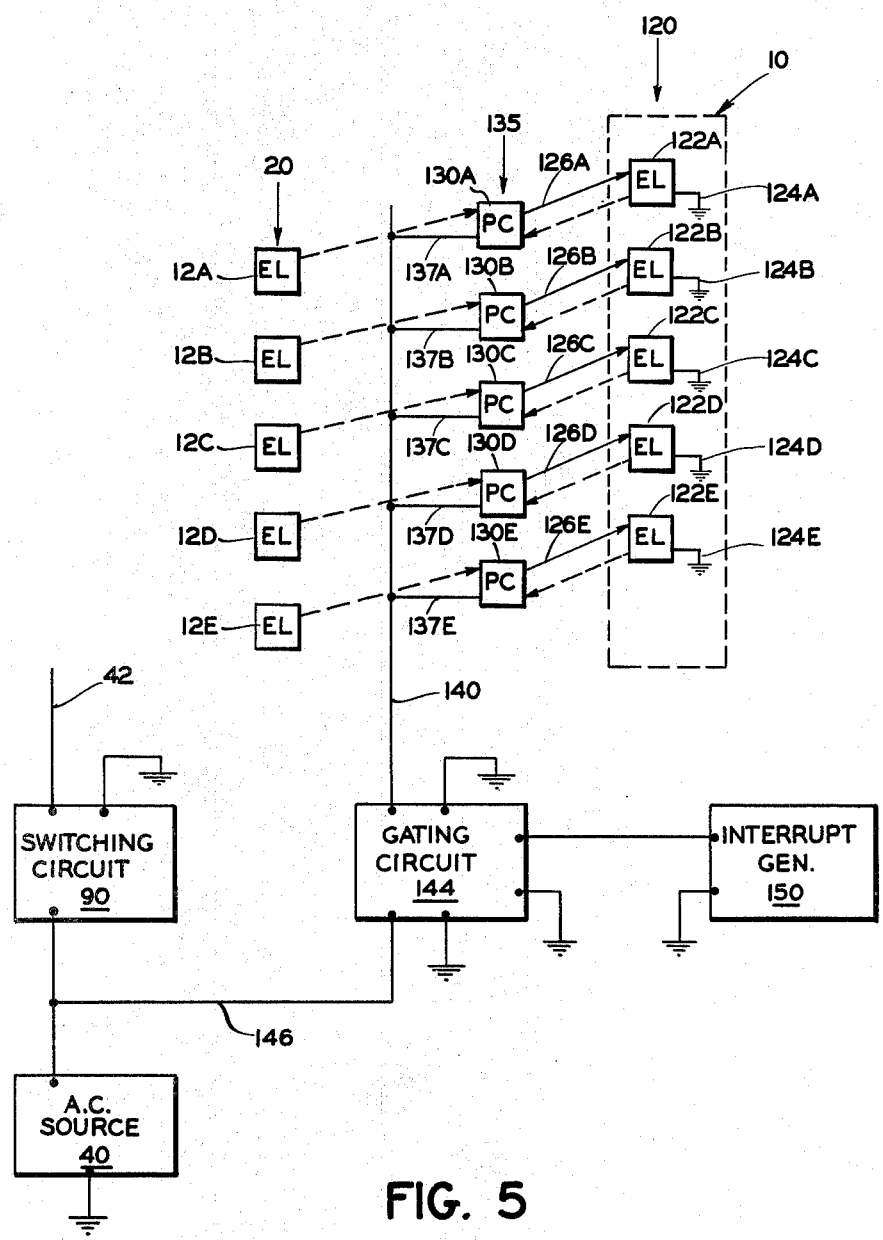
FIGURE 5 is a fragmentary view of another modified form of the invention of FIGURE 3.

In the modified form of the invention of FIGURE 5, the electroluminescent-photoconductor system is the same as that shown in FIGURE 3 except that the electroluminescent segments of column 20 do not provide an indicator function but rather the variable column light 10 of FIGURE 1 is provided by the additional column of electroluminescent segments 120 including the electroluminescent segments 122A, 122B, 122C, 122D, and 122E, for example, which are in turn connected to the source 40 of alternating current through ground connections 124A to 124E, the several electrical conductors 126A to 126E photoconductor elements 130A to 130E, respectively, of column 135, with photoconductor elements being connected through suitable conductors 137A to 137E, respectively, leading to a main line 140 controlled through a gating circuit 144 and electrical conductor 146 leading to the source of alternating current 40.

The gating circuit 144 is in turn controlled by an "interrupter" generator 150 which serves to periodically energize the gating circuit so as to open the connection between the conductors 146 and 140 to the source of alternating current 40.

The electroluminescent segments 12A–12F of the column 20 are in turn arranged so as to direct light rays on the respective photoconductor segments 130A to 130E, as indicated by the dotted line arrows, and so as to render the photoconductor segments 130A to 130E, respectively, conductive. Thus, electrical energy may be conducted through the photoconductor elements 130A to 130E, the electroluminescent segments 122A to 122E to effect energization thereof and to in turn direct the light rays back onto the photoconductor segments 130A to 130E, as indicated by dotted line of arrows in the drawing of FIGURE 5.

In the aforenoted arrangement, it is seen that the column 120 of the electroluminescent elements 122A to 122E will provide the variable light indicator column which may be viewed at 10 as shown in FIGURE 1. Further, by means of the periodic "interrupter" generator 150, the electroluminescent segments of column 120 may latch onto the segments 12A to 12F at column 20 at desired regular intervals provided by the operation of the gating circuit 144 by the "interrupter" generator 150.

The foregoing arrangement may be utilized either with indicator arrangement of FIGURE 2 or indicator arrangement of FIGURE 3 and would avoid the difficulties heretofore noted in the lighting effect of the arrangement of FIGURES 2 and 3.

While several embodiments of the invention have been illustrated and described, various changes in the form and relative arrangement of the parts, which will now appear to those skilled in the art may be made without departing from the scope of the invention. Reference is, therefore, to be had to the appended claims for a definition of the limits of the invention:

What is claimed:

1. An indicator device comprising; a first series of electroluminescent-photoconductor elements, a first source of electrical energy for energizing said first series of electroluminescent-photoconductor elements, first means for controlling application of electrical energy from said first source of electrical energy to said first series of electroluminescent-photoconductor elements, a second series of electroluminescent-photoconductor elements, a second source of electrical energy for energizing said second series of electroluminescent-photoconductor elements, second means for controlling the application of electrical energy from said second source to said second series of electroluminescent-photoconductor elements, condition responsive means for controlling said second control means in response to a sensed condition, the electroluminescent elements of the first series being arranged in cooperative relation with an indicator indicia of an indicator scale, the electroluminescent-photoconductor elements of the first series being controlled by the electroluminescent-photoconductor elements of the second series in such a manner that the electroluminescent elements of the first series will provide a variable length light column cooperating with the indicia of the indicator scale to indicate the sensed condition.

2. The combination defined by claim 1 including an interrupter generator periodically operable to actuate one of said control means for a predetermined length of time.

3. Indicator display means comprising in combination linear indicator scale means, electroluminescent-photoconductor means for providing a variable lighted column for cooperation with said linear scale means to indicate a sensed condition, said electroluminescent-photoconductor means including a series of electroluminescent segments cooperatively arranged in relation to said linear scale indicator means for cooperating therewith to effect an indicator function, a first series of photoconductor segments arranged between the electroluminescent segments and a first source of electrical energy for controlling the energization of the electroluminescent segments, a second series of photocondutcor segments and another series of electroluminescent segments, the second series of photoconductor segments being arranged between the second series of electroluminescent segments and a second source of electrical energy for controlling the energization of said second series of electroluminescent segments, the second series of electroluminescent segments being arranged for controlling the conductivity of the first series of photocondutcor segments, and condition sensing means for controlling energization of one of said series of photoconductor segments so that the first mentioned series of electroluminescent segments may be so controlled as to provide a variable length light column cooperating with the linear indicator scale means to indicate the sensed condition.

4. An indicator device comprising in combination; indicator scale means, a variable length light column including electrical luminescent segments cooperating with said indicator scale means for providing an indicator function, means for effecting said variable length light column including electroluminescent-photoconductor means for sequentially increasing the lighting of said electrical luminescent segments, means for periodically interrupting the lighting operation of said electroluminescent-photoconductor, means for indicating variable input datum to the indicator scale means, and condition sensing means for effecting the operation of the electroluminescent-photoconductor means in response to a sensed condition.

5. The combination defined by claim 4 including an interrupted generator means for periodically rendering the electroluminescent-photoconductor means ineffective for a predetermined period of time and for deenergizing the electroluminescent-photoconductor means for indicating variation of the sensed input to the indicator scale means.

6. The combination defined by claim 4 including a gating circuit for said interrupted generator to operate the gating circuit voltage to render the electroluminescent-photoconductor means ineffective for a predetermined length of time for indicating variation of the sensed input to the indicator scale means.

References Cited by the Examiner

UNITED STATES PATENTS

| | | | |
|---|---|---|---|
| 2,755,457 | 7/1956 | Diemer et al. | 313—108.1 |
| 2,783,453 | 2/1957 | Rose | 340—213 |
| 2,907,001 | 9/1959 | Loebner | 313—108.1 |
| 3,059,144 | 10/1962 | Bowerman | 313—108.1 |
| 3,069,596 | 12/1962 | Morgan | 315—169 |
| 3,073,963 | 1/1963 | Marko | 250—213 |

NEIL C. READ, *Primary Examiner.*